(12) United States Patent
Spahi et al.

(10) Patent No.: US 8,708,727 B2
(45) Date of Patent: Apr. 29, 2014

(54) HIGH TEMPERATURE, HIGH PRESSURE SUBSEA ELECTRICAL CONNECTOR SYSTEM

(75) Inventors: Sami S. Spahi, Winter Springs, FL (US); James M. Widar, Deland, FL (US); Roy E. Jazowski, Ormond Beach, FL (US)

(73) Assignee: Teledyne Instruments, Inc., Thousand Oaks, CA (US)

( * ) Notice: Subject to any disclaimer, the term of this patent is extended or adjusted under 35 U.S.C. 154(b) by 55 days.

(21) Appl. No.: 13/592,144

(22) Filed: Aug. 22, 2012

(65) Prior Publication Data
US 2013/0065429 A1    Mar. 14, 2013

Related U.S. Application Data

(60) Provisional application No. 61/533,351, filed on Sep. 12, 2011.

(51) Int. Cl.
*H01R 13/52* (2006.01)

(52) U.S. Cl.
USPC ..... 439/271; 439/935; 439/589; 174/152 GM (58) Field of Classification Search
USPC .......... 439/271, 935, 589, 936, 736; 174/152 GM, 151, 152 R
See application file for complete search history.

(56) References Cited

U.S. PATENT DOCUMENTS

| | | | | |
|---|---|---|---|---|
| 2,429,955 A | * | 10/1947 | Goldsmith | 174/153 R |
| 3,898,731 A | | 8/1975 | Ring et al. | |
| 4,174,145 A | | 11/1979 | Oeschger et al. | |
| 4,580,003 A | * | 4/1986 | Bowsky et al. | 174/152 GM |
| 5,584,716 A | * | 12/1996 | Bergman | 439/282 |
| 6,582,251 B1 | * | 6/2003 | Burke et al. | 439/589 |
| 7,081,012 B2 | * | 7/2006 | Gensert et al. | 439/559 |
| 7,097,501 B2 | * | 8/2006 | Shah | 439/589 |
| 7,674,124 B2 | * | 3/2010 | Nicholson | 439/281 |
| 8,123,549 B2 | | 2/2012 | Jazowski et al. | |

(Continued)

FOREIGN PATENT DOCUMENTS

GB    2 434 698 A    8/2007

OTHER PUBLICATIONS

Ceramtec. "Pressure." Advanced Ceramic-to-Metal & Glass-Ceramic Sealing Technology. 2008 Catalog, 11 pages. Exact date unknown but published 2008.

(Continued)

*Primary Examiner* — Gary Paumen
(74) *Attorney, Agent, or Firm* — Procopio Cory Hargreaves & Savitch LLP (57) ABSTRACT

Each feed-through pin of a multiple-phase, high voltage plug-pin connector comprises at least one conductor having a first insulation layer extending along at least part of its length, the insulation layer having an enlarged, load-bearing portion of non-circular cross-section having oppositely directed projections, configured for engagement in a correspondingly shaped bore portion of the connector shell. The load-bearing portions may be of a rhomboidal cross sectional shape with rounded corners, with a first diagonal length shorter than a second diagonal length. The pins are spaced around the central longitudinal axis of the shell with the shorter diagonal of each load-bearing portion extending radially and the oppositely directed projections extending into the radial spaces in the shell between adjacent pins. This arrangement allows space within a limited diameter feed through hole for the enlarged, load-bearing shoulder portions of the insulation layer.

60 Claims, 7 Drawing Sheets

(56) References Cited

U.S. PATENT DOCUMENTS

2008/0314616 A1 12/2008 Benestad et al.
2010/0035452 A1 2/2010 Mudge, III et al.
2011/0034041 A1 2/2011 Sivik et al.

OTHER PUBLICATIONS

Offshore Technology: Glynwed-Frialit®-Degussit® High Tech Engineering and Electro Ceramic Components, Electro Ceramic Components: Electrical feedthroughs and Standoffs, http://www.offshore-technology.com/contract, from web page posted at least as early as Jul. 1, 2011.

Solid Sealing: Solid Sealing Technology Inc., Drawing of 5KV Pressure Feedthrough, Jun. 6, 2006.

International Search Report and Written Opinion for related PCT/US2012/052134, mailed on Jul. 25, 2013, in 13 pages.

* cited by examiner

HIGH TEMPERATURE, HIGH PRESSURE SUBSEA ELECTRICAL CONNECTOR SYSTEM

RELATED APPLICATION

The present application claims the benefit of co-pending U.S. provisional pat. App. Ser. No. 61/533,351, filed Sep. 12, 2011, the contents of which are incorporated herein by reference in their entirety.

BACKGROUND

1. Field of the Invention

The present invention relates generally to an electrical connector assembly or system for subsea use in a high temperature, high pressure, high voltage, and high current environment which may be used as a wet-mate, dry-mate, or feed-through system.

2. Related Art

Electrical connectors or penetrators are used to connect a power source to subsea electric submersible pump (ESP) equipment and the like which pump hydrocarbons in oil well installations, and also in other applications such as high pressure downhole electrical penetrations and other penetrations to provide power to various types of subsea equipment. The penetrator extends through the wall or bulkhead of the vessel in which the equipment is located, and is normally connected to power cables at one end for connecting the equipment to an external power source. In an ESP application, the connection or penetrator cannot be isolated from the pumping pressure for practical reasons. This creates an extreme environment for the connector or penetrator in terms of pressure, temperature, and high voltage.

A number of high power electrical penetrators have been developed that can operate at high temperatures while maintaining a hermetic seal and pressure barrier for both internal pressure created by the ESP and external pressure caused by the depth in seawater. The problem with such feed-through or connector systems is the limited tube hanger (TH) electrical feed-through hole diameter designated for the wet-mate penetrator. Typically, in low temperature installations, PEEK (polyether-ether-ketone) is used as the pressure barrier and insulating component for the feed-through pin, because of the high dielectric strength and structural properties of PEEK at relatively lower temperatures. However, the structural integrity as well as the dielectric strength of PEEK can be compromised at higher temperatures. Therefore, for high temperature applications, a ceramic insulation has been utilized to handle the mechanical stress. Since the dielectric strength of ceramics that are suitable for such applications is comparatively lower than PEEK insulation, a larger ceramic insulation thickness is required to move the ground plane at a sufficient distance from the conductor. However, only a limited diameter space is available in the tube hanger for the feed-through system. This is even more of a problem when more than one feed-through pin is needed.

SUMMARY

Embodiments described herein provide for an electrical penetrator assembly or system capable of fitting into a relatively small diameter space and which is particularly suitable for high pressure, high temperature, and high voltage applications typically encountered in subsea installations such as oil wells.

According to one aspect, an electrical penetrator assembly is provided which comprises a high voltage plug-pin connector that is subjected to both external seawater pressure in the forward direction and a pump pressure in the annulus or reverse direction. The assembly comprises an outer shell of a predetermined outer radius having at least one through bore, a first end configured for exposure to a relatively low pressure environment, and a second end configured for exposure to a high pressure subsea environment, and at least one electrical feed-through pin extending through the bore and in sealing engagement with the through bore, the pin having a first end portion extending out of the first end of the shell and a second end portion extending out of the second end of the shell, the first end portion having a first end configured for communication with a respective conductor in a first electrical cable and the second end portion having a second end configured for communication with a respective conductor in a second, subsea electrical cable. The feed-through pin has a conductive shaft of one or more pieces extending between the first and second ends of the pin and at least one insulation layer extending along at least a major portion of the length of the conductive shaft, the insulation layer having an enlarged, load-bearing portion of non-circular cross-section located between opposite first and second ends of the insulation layer. The load-bearing portion has a pair of opposite projections defining a first diagonal dimension of the non-circular cross-section and a pair of connecting portions of reduced thickness extending between the projections and defining a second diagonal dimension of the non-circular cross-section of the pin which is less than the first diagonal dimension. In one embodiment, the second diagonal dimension is less than the shell radius and is oriented to extend radially in the shell, and the first or longer diagonal dimension is greater than the shell radius. The shell through bore receiving the pin has an enlarged portion engaging the enlarged, load bearing portion of the pin which is of shape at least substantially matching the shape of the enlarged load bearing portion of the pin.

In one embodiment, the connector is a three-phase high voltage plug-pin connector where the outer shell has bores through which three identical electrical feed-through pins with enlarged, load bearing portions of non-circular cross-section extend. Each feed-through pin comprises at least one conductor having at least a first insulation layer or sleeve extending along at least part of its length, the insulation layer having an enlarged portion of non-uniform thickness at an intermediate location in its length configured for passing through a corresponding bore portion of the connector shell. In some embodiments, the enlarged pin portions may have a substantially rhomboidal cross-sectional shape, where a rhomboidal shape is defined as a parallelogram with oblique angles. The sides of the parallelogram may be of equal length (i.e. a rhombic shape) in one embodiment, or of unequal length in alternative embodiments. The corners of the rhomboidal cross-sectional shape are rounded. The insulation layer may be of ceramic or other high temperature insulation materials.

The corresponding bore portions of the shell which receive the enlarged, load-bearing portions of the pins are of similar or matching non-circular shape and are arranged with the smaller diagonal dimension of each enlarged portion of the bore oriented radially in the shell and opposite projections extending into radial regions of the shell between adjacent bores. In one embodiment, the enlarged or rhomboidal shaped portion of a bore for receiving a first pin has first and second adjacent, non-perpendicular faces which are adjacent and parallel to a corresponding second face of the enlarged portion of a second bore for receiving a second pin and a corresponding first face of the enlarged portion of a third bore for receiving a third feed-through pin, respectively. This permits use of regions within the radial space inside the outer diameter of the shell (which would otherwise be unoccupied if the pins were cylindrical) for load bearing. This arrangement also enables moving of the concentric ceramic ground plane further away than would be possible with an insulation layer of cylindrical shape along its entire length which was concentrically with the conductive shaft. This allows for better insulation along with increased mechanical strength due to the larger load bearing portions of the ceramic insulating layer. The rhomboidal cross-sectional shape of the enlarged portions of the pins passing through the connector allows the packaging of the ceramic insulation within a compact diameter while still providing sufficient insulation to meet the electrical insulation and pressure barrier requirements.

In another aspect, a feed-through pin of a connector or penetrator has two successive insulation layers of different materials configured for positioning in the down-hole region and seawater region of a down-hole power connection. In one embodiment, the first insulation layer is of ceramic material, and has an enlarged, load-bearing portion, followed by a portion of cylindrical, tapering diameter towards the second insulation layer. The first insulation layer is designed to withstand electrical stresses as well as mechanical stress resulting from the pressure differential between the down hole and seawater side of a connector or penetrator. The second insulation layer is of higher dielectric strength material than the ceramic material of the first insulation layer, such as PEEK (polyether-ether-ketone) or similar insulating materials. The second insulation layer is located in a seawater exposed region of the pin and is designed to withstand mainly electrical stress.

The feed-through pin may have a single elongate conductor extending along the entire length of the pin or the majority of the length of the pin, which is shielded by the first and second insulation layers, while in other embodiments the conductive path through the pin may be provided by first and second conductor portions which are telescopically engaged with one another inside the pin receiving bore of the first insulation layer or sleeve. In such embodiments, the inner end of one conductor has a bore and the inner end of the other conductor is slidably engaged in the bore. An internal sliding contact band may be provided between the opposing faces of the bore and post, to maintain electrical contact between the conductors as they move inwardly and outwardly, as described in U.S. Pat. No. 8,123,549, the contents of which are incorporated herein by reference. This allows for compensation for different rates of thermal expansion and contraction of the rigid conductor or pin and the insulating sleeve or layer. In one aspect, the telescopically engaged inner ends of the conductor portions are located within the enlarged rhomboidal shaped portions of the ceramic insulating layer.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 5 is a longitudinal cross-sectional view of an electrical connector or penetrator assembly including three of the feed-through pin subassemblies of FIGS. 1 to 2B, 4A and 4B, extending through a tube hanger electrical feed-through hole of a down-hole, subsea oil well or the like, to provide power for an electrical submersible pump or the like.

DETAILED DESCRIPTION

Certain embodiments as disclosed herein provide for an electrical penetrator assembly suitable for use in high pressure, high temperature and high voltage applications, such as in providing power for subsea equipment such as a down-hole electrical submersible pump (ESP) in an oil well.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention.

Figure 1:
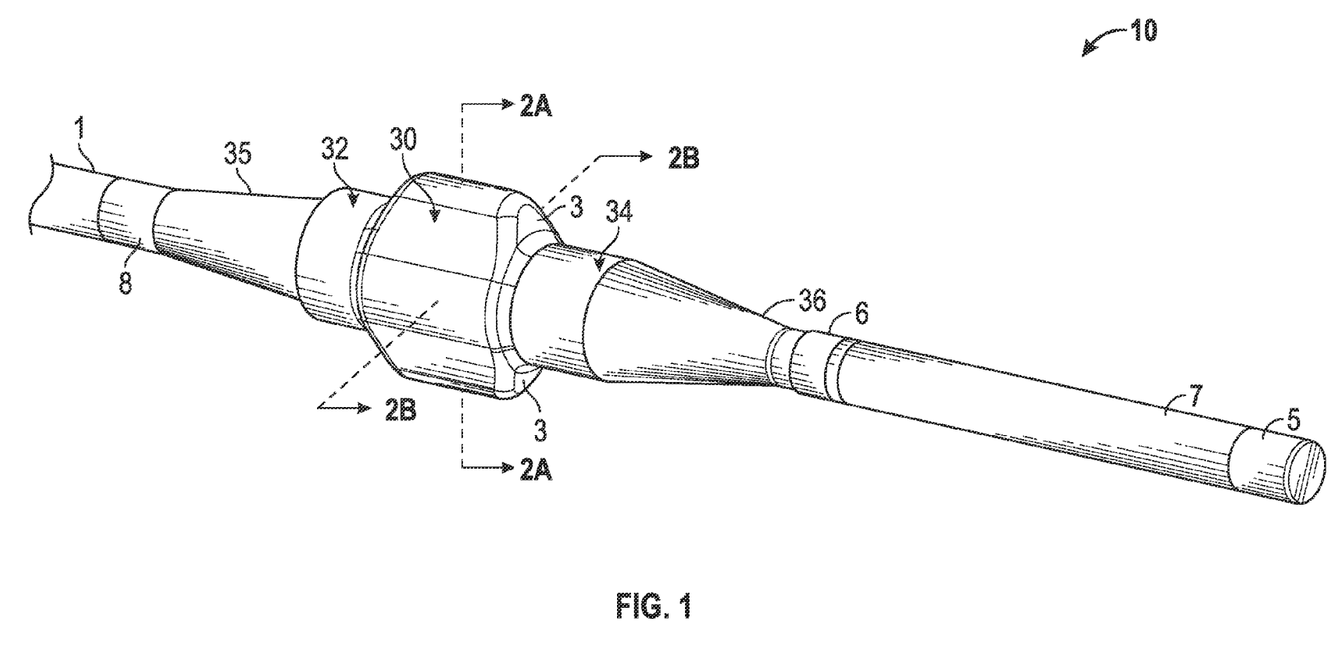
FIG. 1 is a perspective view of a first embodiment of an electrical penetrator or feed-through pin for an electrical penetrator or connector system.
Figure 2A:
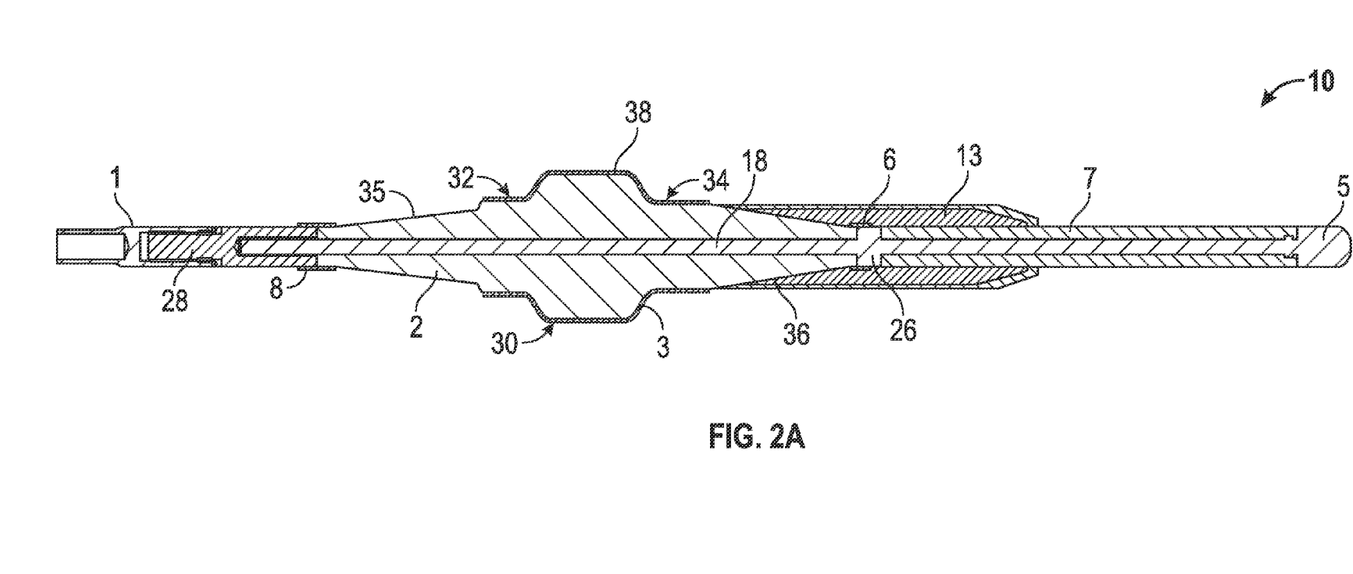
FIG. 2A is a cross-sectional view on the lines 2A-2A of FIG. 1.
Figure 2B:
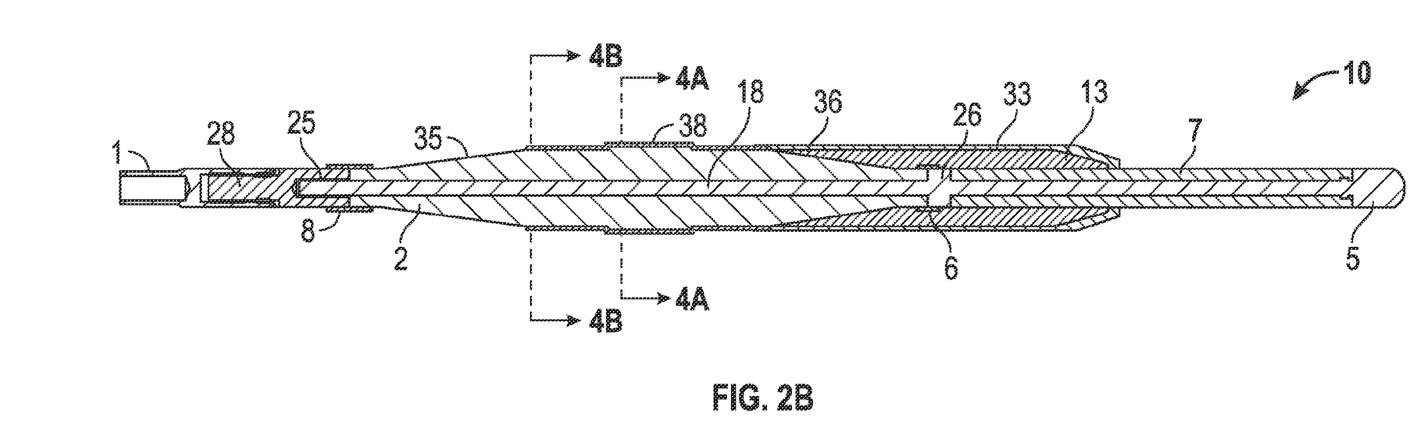
FIG. 2B is a cross-sectional view on the lines 2B-2B of FIG. 1.
Figure 3:
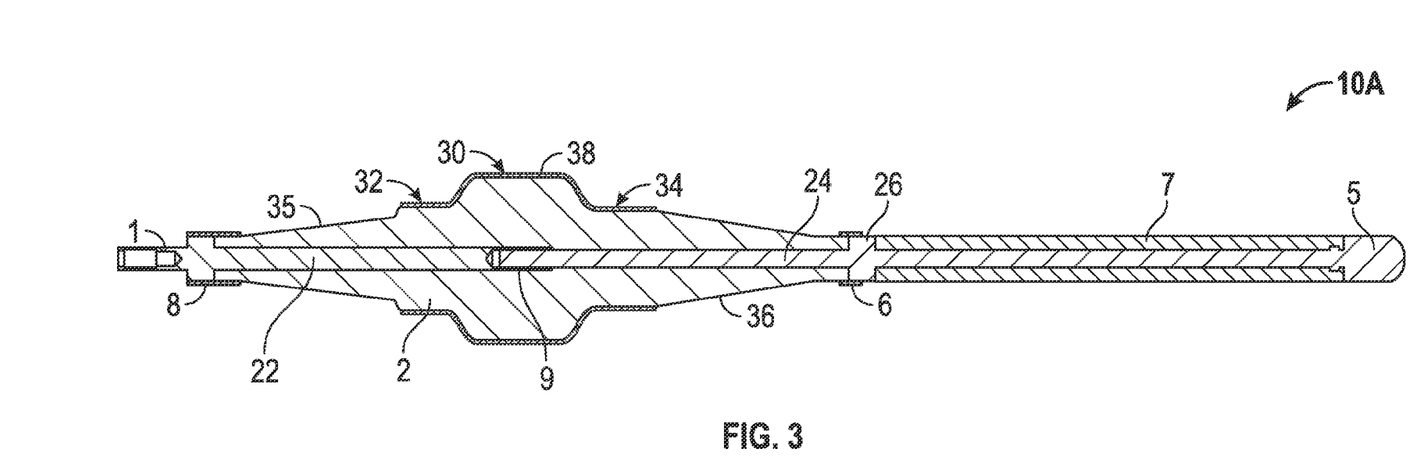
FIG. 3 is a cross-sectional view similar to FIG. 2A but illustrating a modified penetrator with a two-piece feed through pin.
Figure 4A:
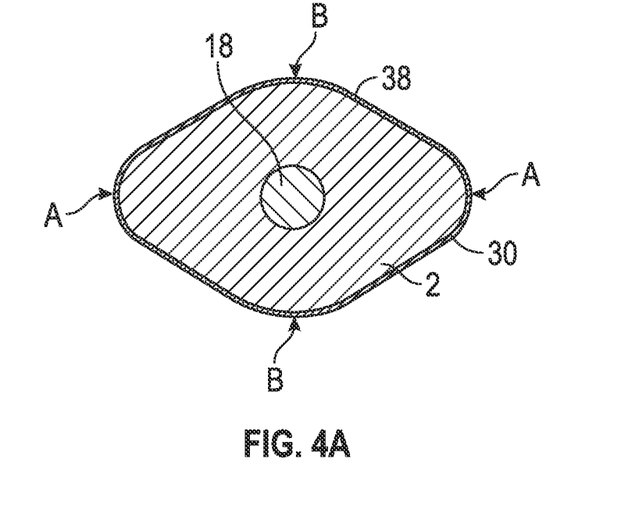
FIG. 4A is cross-sectional view on the lines 4A-4A of FIG. 2B.
Figure 4B:
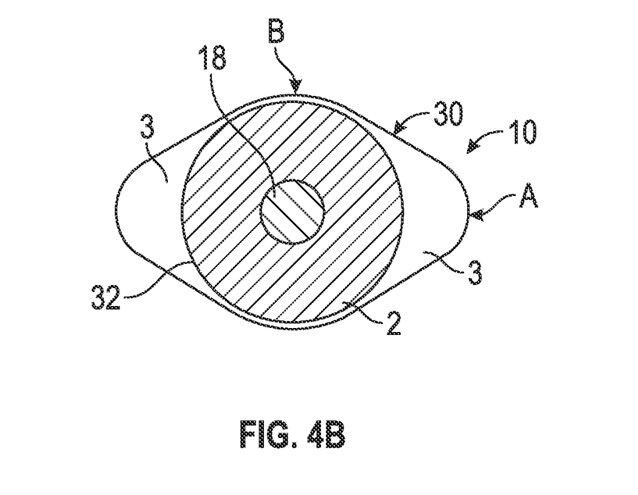
FIG. 4B is a cross-sectional view of the lines 4B-4B of FIG. 2B.
Figure 5:
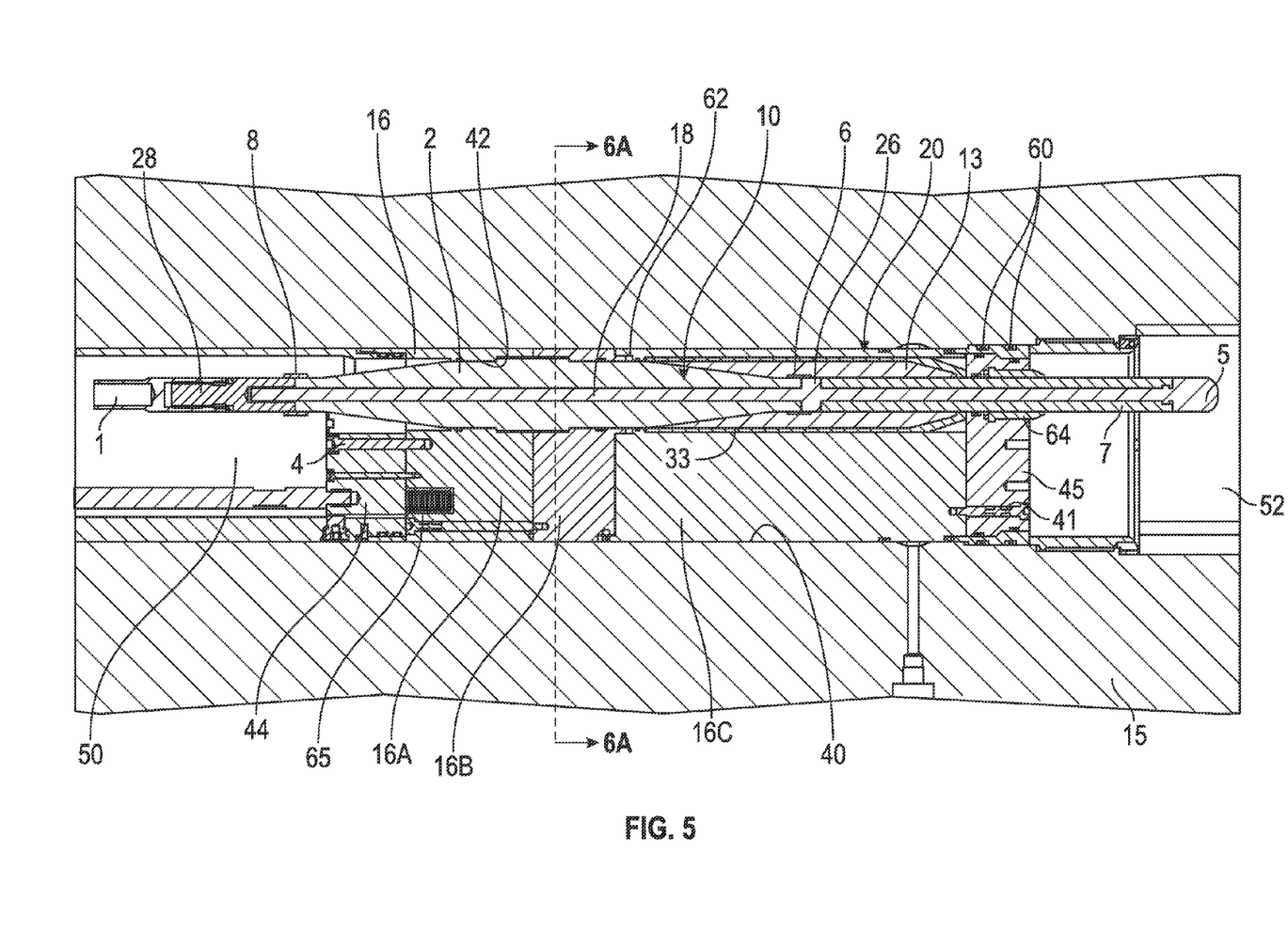
Figure 6A:
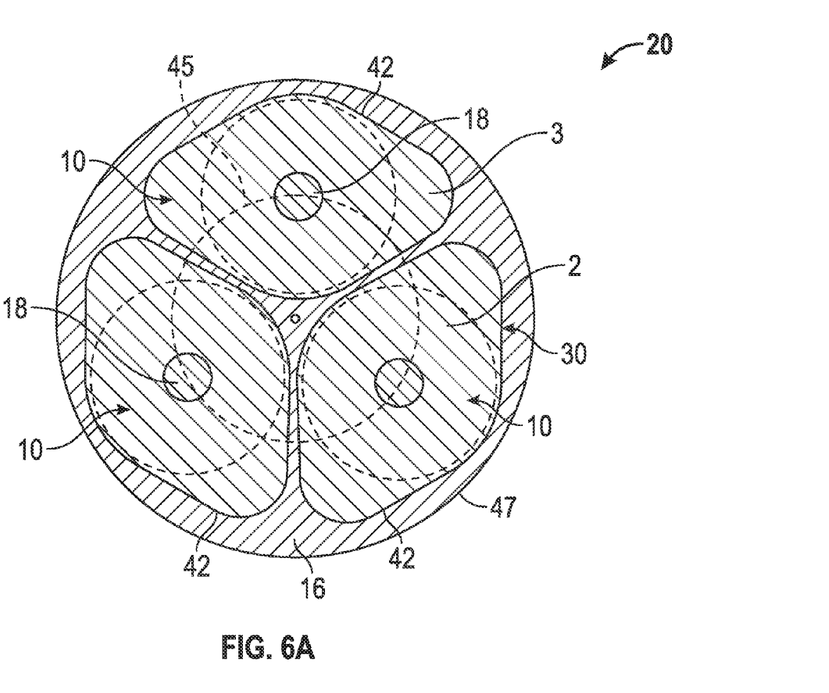
FIG. 6A is a cross-sectional view of the connector on the lines 6A-6A of FIG. 5, illustrating the rhomboidal shouldering geometry of the pin insulating layers in one region of the connector.
Figure 6B:
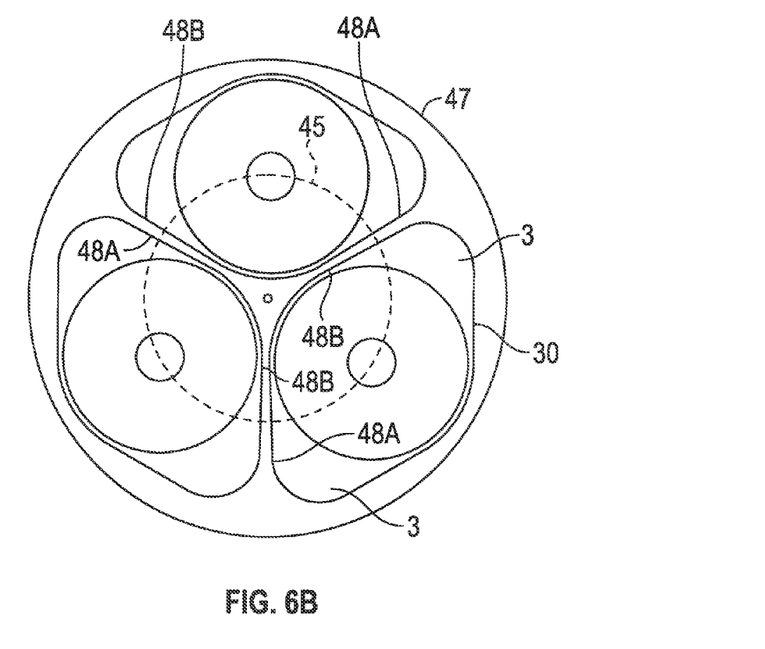
FIG. 6B is a view similar to FIG. 6A but omitting section lines to better illustrate the ceramic insulation thickness relative to other parameters.
Figure 7:
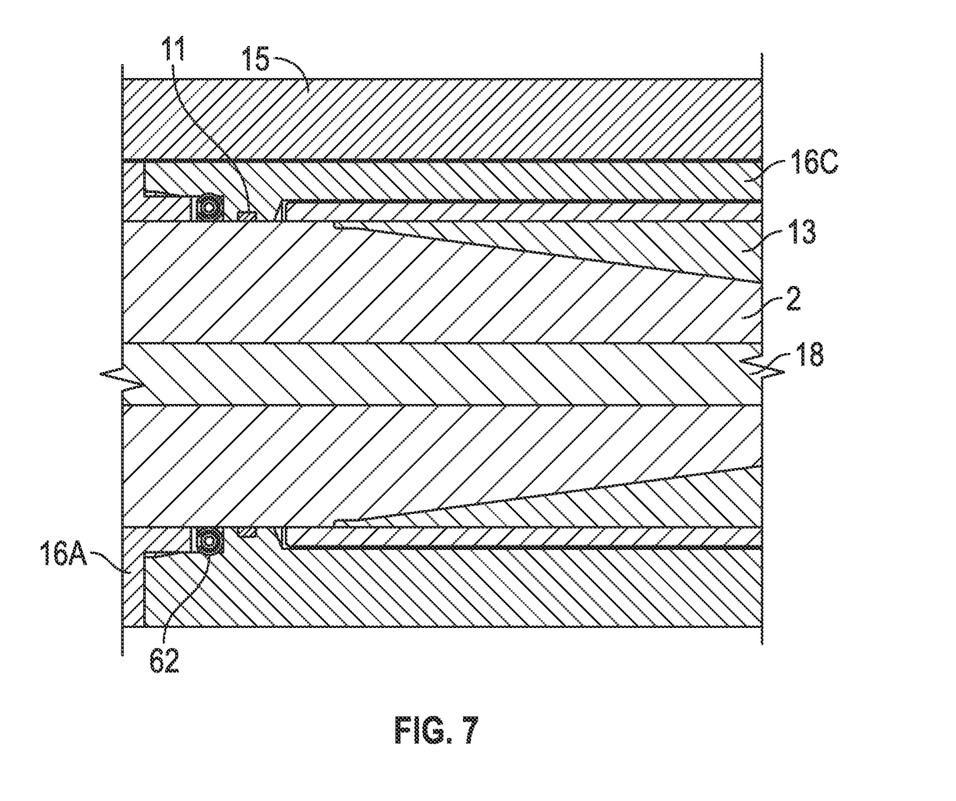
FIG. 7 is an enlarged cross-sectional view of a central part of the penetrator assembly of FIG. 5, illustrating the sealing arrangement between the ceramic insulation and shell in more detail.

FIGS. 1 to 2B, 4A and 4B illustrate a first embodiment of an electrical penetrator or feed-through pin 10 for a subsea feed-through or wet mate connector, while FIG. 3 illustrates a modified pin 10A, and FIGS. 5 to 7 illustrate a three-phase high voltage plug-pin connector or penetrator assembly 20 including three pin subassemblies 10. FIG. 5 illustrates a connector assembly or system 20 in a downhole power connection application, such as a downhole electric submersible pump (ESP) power connecting but the connector system may alternatively be used in a wet mate, dry mate, or other feed-through application. Connector 20 is subjected to both external seawater pressure in the forward direction 52 and internal wellhead pressure or pump pressure in the annulus or reverse direction 50, as illustrated in FIG. 5. Although three circuits or electrical feed through pins are provided in the connector of this embodiment, a greater or lesser number of circuits or phases may be provided in other embodiments.

As illustrated in FIGS. 1 to 2B, each feed-through pin 10 has a conductive shaft or conductor pin 18 of conductive material such as copper, with an outer pin insulation which is broken down into two components of different dielectric materials. Although the conductive shaft is a one-piece elongate conductor extending through outer ceramic insulation layer 2 in this embodiment, in an alternative embodiment as illustrated in FIG. 3 the conductive shaft may be a two part conductor comprising a first conductor portion 22 extending from a first end of the pin and a second conductor portion 24 extending from the first conductor portion to a second (seawater exposed) end of the pin. A two part conductor or adjustable length conductor may be helpful in some cases to relieve stresses resulting from the different coefficients of expansion of materials used in the feed-through pin. In the embodiment of FIGS. 1 to 2B, stress relief is provided between the cable connected end of the pin and an attached cable, as discussed in more detail below.

As illustrated in FIGS. 2A and 2B, the one end of conductive shaft 18 engages in a bore in a metal stem 28, and stem 28 extends into a bore in cable termination 1. Stress relief is provided by the telescopic engagement of stem 28 in the bore of cable termination 1. A first insulating sleeve or insulation layer 2 of ceramic material extends over conductor pin 18 from stem 28 up to a stepped shoulder 26 of pin 18. A first metal sealing sleeve 8 extends over the junction between stem 28 and ceramic sleeve or layer 2. A second insulation layer 7 of different insulating material having a higher dielectric strength than ceramic is provided in an indented region of pin 18 which terminates short of the exposed probe or contact end 5 of the pin. A second metal sealing sleeve 6 extends over the junction between the plug end of ceramic layer 2 and the enlarged shoulder 26 of conductor pin 18, terminating prior to second insulation layer 7.

Second insulation layer 7 insulates a portion of the conductor which is exposed to seawater in a connector installation, as illustrated in FIG. 5 and described in more detail below. In one embodiment, the second insulation material in layer 7 is of PEEK (polyether-ether-ketone). PEEK is selected for insulating the seawater region of the pin or conductor 18 for two main reasons. First, the second insulating layer 7 of PEEK is removed from the mechanical loading resulting from the pressure differential, which occurs in the ceramic insulated region of the conductor. Since the heat-deflection temperature of PEEK can be lower than the expected operating temperature range, avoiding such mechanical loading reduces the risk of structural failure. Second, the relatively higher dielectric strength of PEEK allows for a smaller diameter in layer 7, providing a compact pin structure at the plug-pin penetration region, leading to a compact design configuration for a mating receptacle unit of a connector system having contact sockets configured for receiving the projecting probe ends of the feed-through pins in a conventional manner as used in known pin/plug and socket/receptacle wet mate electrical connectors. The ceramic material of layer 2 is selected for the pressure barrier and insulating component due to its structural and dielectric properties that are sustainable at higher temperatures than PEEK, or at least at operating temperature in a downhole feed-through application.

The ceramic layer 2 of the pin 10 has an enlarged load-bearing portion 30 of non-circular cross-section, i.e. non-cylindrical shape, as best illustrated in FIGS. 1, 2A, 4A and 4B, and has thicker, extended and oppositely directed projections which form load-bearing shoulders 3. As best illustrated in FIGS. 4A and 4B, the enlarged portion 30 in one embodiment has a rhomboidal cross-sectional shape, where a rhomboid is a parallelogram with oblique angles and rounded corner regions A, B. In the illustrated embodiment, the rhomboidal shape is a rhombus with adjacent sides of equal or substantially equal length, but the rhomboidal shape may have adjacent sides of unequal lengths in alternative embodiments. Cylindrical collar portions 32, 34 are located on each side of enlarged, load-bearing portion 30. The non-circular cross-sectional shape allows the pins to fit into an outer shell of smaller diameter than a corresponding pin with the typical circular shouldering geometry, as explained in more detail below with reference to FIGS. 6A and 6B. Although the cross-sectional shape of the enlarged portion of layer 2 is a rhombus with rounded corners A, B in the illustrated embodiment, the enlarged portion or shouldering region may have other non-cylindrical geometrical shapes in alternative embodiments. For example, the cross-sectional shape may be a rhomboid with adjacent sides of unequal length, or any other shape having oppositely directed enlarged regions or shoulders connected by partially cylindrical regions B. The non-circular or rhomboidal shape has a first diagonal dimension between the rounded corners A of the projections, and a second diagonal dimension between the rounded corners B, with the length of the second diagonal dimension being less than that of the first diagonal dimension. In one embodiment, connecting regions or part cylindrical regions B are of reduced thickness and the second diagonal dimension is identical or slightly greater than the diameter of adjacent cylindrical collar portions 32, 34 of the insulation layer, as best illustrated in FIG. 4A.

A first tapered portion 35 of gradually increasing diameter extends from metal sealing sleeve 8 to cylindrical portion 32, and a second tapered portion 36 of gradually reducing diameter extends from cylindrical portion 34 to metal sleeve 6 prior to PEEK insulation layer 7. An outer coating or metallization 38 of conductive material is applied over portions 30, 32 and 34 as a ground shield for electrical stress control, and also creates a tight seal with any metal seal between the pin and the shell bore through which it extends, as described in more detail below. A ceramic surface is not ideal for metal seals. As shown in FIG. 2, the tapered portion 36 of the ceramic insulation 2 gradually decreases in diameter as it transitions down towards the thinner PEEK insulation layer 7 which is seated in a recessed region of the conductor portion 24, as illustrated in FIGS. 2A and 2B. The progression angle (taper) is intended to minimize or reduce potential tracking by increasing the distance between the metal sleeve conductor 6 and the ground plane. An optional auxiliary insulation layer 13 of elastomeric material extends over the tapered portion 36 of insulation layer 2, metal sealing sleeve 6, and part of PEEK insulation layer 7 in one embodiment, as illustrated in FIGS. 2A and 2B.

A cable termination 1 is provided at the outer end of the first conductor portion 22 for connection to a first cable on one side of the penetrator or connector assembly, while the outer exposed contact end 5 of conductor pin or conductive shaft 18 on the seawater or plug end is designed as a probe for mating with a contact socket of a mating receptacle unit at the end of another cable or the like in the illustrated embodiment. In alternative embodiments, contact probe 5 may alternatively be designed with a cable termination for connection to a second cable on the opposite side of the penetrator assembly. Metal sealing sleeves 8, 6 at each end of the ceramic layer or sleeve 2 seal the outer ceramic body to the adjacent portions of the conductive shaft or pin 18. As illustrated in FIGS. 2A and 2B, each sealing sleeve is brazed/welded flat across the junction between the ceramic insulation later and conductive material, at both sides of the pressure barrier. One of the flat or cylindrical metal sleeves 6 is electron beam (EB) welded to the copper conductor portion 24 and brazed onto the ceramic layer or sleeve at the seawater side. Similarly, the second metal sleeve 8 is EB welded to the copper conductor or stem at the termination end and brazed onto the ceramic layer or sleeve, but at the termination (wellhead) side, as illustrated in the assembled view of the connector in FIG. 5.

To compensate for the relatively lower dielectric strength of ceramic, the ceramic body is designed at a larger diameter, or cross-sectional size, moving the ground plane away from the conductor. It may alternatively or additionally be complemented with an elastomeric insulation layer 13, as illustrated in FIGS. 2B and 5 and described in more detail below.

In the alternative embodiment of the penetrator pin 10A illustrated in FIG. 3, the one-piece conductor pin or shaft 18 of FIGS. 2A and 2B is replaced with first and second conductor portions 22, 24 have slidably engaged inner ends, with the first conductor portion 22 extending through part of the first insulating layer or sleeve 2 from metal sealing sleeve or ring 8 and terminating in the larger size, load-bearing portion 30 of layer 2, and the second conductor portion 24 extending from probe or contact end 5 and also terminating in the load-bearing portion 30 of layer 2. The penetrator pin device is otherwise identical to that of FIGS. 1 to 2B, and like reference numbers are used for like parts as appropriate. The conductor portions are of suitable rigid conductive material such as copper or the like, and the inner ends of the two portions are telescopically engaged, in a similar manner to the two part conductors of the electrical penetrator assembly described in U.S. Pat. No. 8,123,549 referenced above, the contents of which are incorporated herein by reference. The inner end of the first conductor portion 22 has an inwardly extending bore and inner end of the second conductor portion 24 is slidably or telescopically engaged in the bore, so that the overall length of the conductive pin assembly can vary. An internal sliding contact band 9 mounted in an annular recess in the bore provides a sliding electrical engagement or contact interface between the conductor portions while permitting the portions 22, 24 to telescope inwardly and outwardly to compensate for various types of stress. Band 9 provides a clearance between the opposing inner surface of bore and outer surface of pin 24, while still providing electrical contact between the two conductor portions at all times. The contact band may alternatively be mounted on the outer surface of the conductor portion 24 where it engages in bore in other embodiments. As described in the aforementioned U.S. Pat. No. 8,123,549 which is incorporated herein by reference, the use of two copper conductor portions 22,24 connected by a contact band 9 provides a degree of freedom in the axial direction. This helps relieve some of the residual stresses at higher temperatures resulting from differences in the coefficients of thermal expansion.

In the embodiment of FIGS. 2A and 2B, a similar contact band may be provided between the telescopically engaging portion of stem 28 and the bore in cable termination 1.

FIGS. 5, 6A and 6B illustrate one embodiment of a feed-through assembly or three-phase plug pin connector 20 extending through an electrical feed-through hole or bore 40 of a tubing hanger 15 of a wellhead, with three of the feed-through pins 10 as illustrated in FIGS. 1 to 3 extending through corresponding bores 42 in the metal shell 16 of the connector 20. The enlarged, rhomboidal shaped portion 30 of each pin extends through a corresponding rhomboidal shaped portion of the respective pin through bore 42, as best illustrated in FIGS. 5 and 6A, with the shapes being rhombic in the illustrated embodiment. The metal shell is formed in multiple parts, and in the illustrated embodiment comprises a rear or base wall 16A, an intermediate portion 16B, and an extended support portion 16C which are secured between end walls 44 and 45 at the internal end and seawater exposed end, respectively, of the connector 20. Bellows 65 is provided for pressure compensation. The shell portions each have aligned bore portions which together form the bores 42 for receiving the feed-through pins 10. The enlarged, rhomboidal shaped portions of the bore for receiving enlarged rhomboidal portions 30 of the ceramic insulating layer of each pin extend from base wall 16A into intermediate shell portion 16B, allowing the feed-through pins 10 to be inserted into the respective bore portions before the shell portions 16A and 16B are secured together via suitable fasteners 41.

Elastomeric auxiliary insulation layer 13 extends over the tapered down portion 36 of the ceramic insulation layer 2 as well as the metal sealing sleeve 6 and part of the PEEK insulation layer 7, as illustrated in FIGS. 2B and 5. An additional thin insulating layer or coating 33 may be provided over elastomeric layer 13. The ceramic layer 2 is tapered along the length of portion 36 to increase the distance from sealing sleeve 6 to metallized ground plane 38. The elastomeric insulation sleeve 13 and enlarged size, load-bearing portion 30 of the ceramic insulation together compensate for the relatively lower dielectric strength of the ceramic material in layer 2. Additionally, tapering the ceramic provides a much better seal along the length of the ceramic due to the radial squeeze effect of the elastomeric sleeve 13.

FIG. 6B is a similar view to FIG. 6A, omitting section lines for clarity, and indicating various parameters of the geometrical structure of the connector. As illustrated in FIG. 6A, the feed-through pins 10 are arranged so that the shortest diagonal dimension of the rhombic or rhomboidal shaped cross-section, between rounded corners B of FIG. 4A, is oriented radially. Circle 45 shown in dotted outline in FIGS. 6A and 6B extends through the center of each pin. The largest dimension of the rhomboid, i.e. the diagonal between the outer ends or rounded corners of the opposite projections 3, is oriented non-radially relative to the center of the shell, so that the shell can have a minimal radius slightly larger than the smallest diagonal dimension of the enlarged rhomboidal shaped portion of respective pins 10 (dimension B-B in FIG. 4A). At the same time, the larger diagonal dimension A-A between the outer ends of the projecting or largest portions or projections 30 of the rhomboidal shape regions of each insulating layer is longer than the shell radius, and these projections extend into otherwise unused regions of the shell between the adjacent pins, as seen in FIGS. 6A and 6B. The projections fill a substantial portion of a radial cross-sectional area of the shell between the adjacent pins located between circle 45 and the outer perimeter of the shell. Each enlarged rhomboidal portion 30 of a respective pin has a substantially flat first and second inner faces 48A, 48B extending from an outer end of the respective enlarged portion to the center of the respective reduced diameter or minimum portion. As seen in FIG. 6B, first and second adjacent faces 48A, 48B of the rhomboid of a first pin are located facing and parallel to face 48B of a second pin and face 48A of a third pin, respectively. This provides an optimized, compact shouldering geometry of non-circular cross-section for a three phase pin configuration of the connector. The advantage of having a non-circular, rhomboidal shape shouldering geometry is that it permits the use of unoccupied regions within the connector radial space for load bearing. As illustrated, the enlarged or extended shoulders 3 of the rhomboidal shaped portions 30 of each pin extend into these unoccupied regions, while still remaining inside the outer connector perimeter 47. In turn, this enables the concentric ceramic ground plane to be moved further away from the conductors for better insulation. The rhomboidal or rhombic cross-sectional shape with rounded corners A and B optimizes the use of space within the connector's limited radial space while minimizing or reducing the stress concentration resulting from the pressure differential in this region. The external conductive coating or metallization 38 on each pin is applied as a ground shield for electrical stress control in this region.

There are three potential pathways between the wellhead side and seawater side of the connector illustrated in FIG. 5 which require seals, specifically a first pathway between the outer shell 16 of the connector and the tubing hanger through bore 40, a second pathway between the ceramic insulation layer of each pin and the surrounding shell through bore 42, and a third pathway between the two part copper conductor 18 and the ceramic insulation layer. Each of these pathways is sealed to prevent or restrict leakage along the respective pathway. The feed-through sealing approach is based on the use of metallic seals as primary seals for pressures at the reverse direction (wellhead/Internal 50), and back up elastomeric seals mainly for pressures at the forward direction (Seawater/External 52). Metal seals are preferable in conditions that are susceptible to rapid gas decompression (RGD) or explosive decompression (ED). RGD can occur due to sharp drops or fluctuations in wellhead pressure during the ESP operation. As shown in FIG. 5, the penetrator or connector 20 provides a hermetic seal to the three pathways from the wellhead 50 (Internal) to seawater 52 (External).

The first pathway between the surface of the feed-through connector or penetrator outer shell 16 surface and the inner walls or bore 40 of the tubing hanger (TH) 15 is intercepted by elastomeric seals 60 in the forward (seawater) direction. The second pathway through the connector assembly 20 between the ceramic insulating barrier or layer 2 and the outer shell 15 is sealed by bi-directional (spring energized) metallic C-ring seals 62 in the reverse direction (wellhead), as illustrated in more detail in the enlarged view of FIG. 7. In one embodiment, metallic C-ring seals 62 may be Helicoflex® spring energized seals manufactured by Garlock Helicoflex® of Columbia, S.C. As noted above, the conductive coating or metallization 38 of conductive material creates a tight seal with metal C-ring seals 62 between the pin and the shell bore. The metallic seals are coupled by elastomeric O-ring seals 11, dominantly in the forward (seawater) direction. An additional sealing sleeve 64 is provided between the portion of penetrator pin 10 which projects through end wall 45 and the surrounding through bore in cap or end wall 45.

The third pathway through the pin between the conductive shaft or pin 18 and ceramic insulation layer 2 is sealed by the metal sealing sleeves 6, 8 between the ceramic insulation layer and conductive material of pin 18, e.g. copper, at each end of the ceramic layer, as described above. Flat metal sealing sleeves or rings 6, 8 are chosen to increase the sealing contact pressure/effectiveness upon application of external pressure on either side.

The ceramic-based feed-through system with subsea wetmate connection capabilities described and illustrated herein is capable of managing a multi-stress environment including: high voltage, high current, high temperature and differential pressure. The unique rhomboidal cross-section geometric ceramic insulation configuration fits into the relatively small diameter space allowed for electrical feed-through of a wet mate connector in the tubing hanger while still providing a relatively thick ceramic layer on each pin for improved insulation and increased mechanical strength. Use of a combination of ceramic insulating material in the high load portion of the connector along with a thinner layer of PEEK insulation on the seawater side of a down-hole feed-through application reduces the risk of structural failure while providing a compact pin structure at the plug-pin penetration region, allowing for a more compact receptacle design configuration. The use of pressure or spring energized metallic seals 62 onto a brazed/welded ceramic body in a down-hole feed-through application helps to seal one of the pathways through the assembly of FIG. 4.

In the above embodiments, a hermetic electrical penetrator or connector assembly or system is provided which is suitable for use in high temperature, high pressure, high voltage, and high current applications, such as powering of subsea electrical submersible (ESP) pump equipment which is used to pump hydrocarbons in oil rig installations and the like. Other applications for the penetrator assemblies in the above embodiment include high temperature, high pressure downhole electrical penetrations and other electrical penetrations used in subsea equipment of various types. The connector is designed to fit within the limited diameter available for electrical connectors in downhole applications, while still maintaining a sufficient thickness of insulating material surrounding the conductors of each connector pin, using nonconcentric pin receiving bores in the connector shell together with a rhomboidal shouldering geometry in high load portions of the ceramic insulating layers and corresponding portions of the pin-receiving portions of the shell. This allows use of ceramic insulation to handle the mechanical stress typical of such installations, while providing a larger thickness ceramic layer to compensate for the lower dielectric strength of ceramics. In one embodiment, a second insulation layer of PEEK or other higher dielectric strength material may be provided over the end portion of the pin exposed to sea water, allowing for smaller overall diameter of the pin in this area.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

We claim:

1. A high voltage plug-pin feed-through connector assembly, comprising:

an outer shell of a predetermined radius having at least one through bore, a first end configured for exposure to a relatively low pressure environment, a second end configured for exposure to a high pressure subsea environment;

at least one electrical feed-through pin extending through the at least one through bore and in sealing engagement with the through bore, the pin having a first end portion extending out of the first end of the shell and a second end portion extending out of the second end of the shell, the first end portion having a first end configured for communication with a respective conductor in a first electrical cable and the second end portion having a second end configured for communication with a respective conductor in a second, subsea electrical cable;

the at least one feed-through pin comprising a conductive shaft of one or more pieces extending between the first and second ends of the pin and at least one insulation layer extending along at least a major portion of the length of the conductive shaft, the insulation layer having an enlarged, load-bearing portion located between opposite first and second ends of the insulation layer, the enlarged load bearing portion being of non-circular cross-section and comprising a pair of opposite projections defining a first diagonal dimension of the non-circular cross-section and a pair of connecting portions of reduced thickness extending between the projections and defining a second diagonal dimension of the non-circular cross-section of the pin which is less than the first diagonal dimension; and the at least one through bore having an enlarged portion engaging the enlarged, load bearing portion of the respective pin which is of shape at least substantially matching the shape of the enlarged load bearing portion of the pin.

2. The assembly of claim 1, comprising a plurality of identical feed-through pins and corresponding through-bores through which the respective feed-through pins extend.

3. The assembly of claim 2, wherein the first diagonal dimension is greater than the shell radius and the second diagonal dimension is less than the shell radius, and the feed-through pins and through bores are oriented with the shorter, second diagonal dimension of enlarged load-bearing portion extending radially in the shell, and the oppositely directed projections extending into radial regions of the shell between adjacent feed-through pins.

4. The assembly of claim 3, wherein there are three feed-through pins and the assembly comprises a three-phase high voltage plug-pin connector assembly.

5. The assembly of claim 2, wherein the enlarged load-bearing portions and matching through bore portions are of rhomboidal cross-sectional shape.

6. The assembly of claim 5, wherein the rhomboidal cross-sectional shape is a rhombus with adjacent sides of at least substantially equal length.

7. The assembly of claim 3, wherein the shell has an outer diameter configured to fit in a wellhead tubing hanger electrical feed-through hole of predetermined diameter.

8. The assembly of claim 7, further comprising at least one seal on the outer diameter of the shell configured for sealing engagement with the inner wall of a tubing hanger and a plurality of seals between the insulation layer of each pin and the respective shell through bore.

9. The assembly of claim 8, wherein at least some of the seals are metal seals.

10. The assembly of claim 1, wherein the insulation layer has a first end spaced from the first end of the conductive shaft and a second end spaced from the second end of the conductive shaft.

11. The assembly of claim 10, wherein the insulation layer includes a first tapered portion of reducing diameter extending along at least part of the length of the insulation layer between the enlarged load-bearing portion and the first end of the layer and a second tapered portion of reducing diameter extending along at least part of the length of the insulation layer between the enlarged load-bearing portion and the second end of the layer, the first and second ends of the insulation layer comprising respective first and second junctions between the insulating material and the conductive shaft material.

12. The assembly of claim 11, further comprising a first metal sealing sleeve extending over the first junction and secured to adjacent regions of the insulation layer and the conductive shaft of the pin.

13. The assembly of claim 12, further comprising a second metal sealing sleeve extending over the second junction and secured between the insulation layer and an adjacent conductive region of the pin.

14. The assembly of claim 13, wherein each metal sealing sleeve is welded to the respective conductive region of the conductive pin and brazed onto the adjacent region of the insulation layer.

15. The assembly of claim 3, wherein the shell has three parallel through bores offset from the central longitudinal axis of the shell at equal angular spacings around the shell, and three identical feed-through conductor pins extending through the respective through bores.

16. The assembly of claim 15, wherein the enlarged load-bearing portion of the insulation layer of each conductor pin is of rhomboidal cross-sectional shape and the respective shell bore has a portion of matching rhomboidal cross-sectional shape which receives the load-bearing portion of the insulation layer, each enlarged load-bearing portion of a respective pin having substantially flat inner and outer faces extending from an outer end of the respective enlarged load bearing portion to the center of the respective reduced thickness connecting portions on each side of the respective projection, and each substantially flat inner face opposes and is substantially parallel to a corresponding substantially flat inner face of the enlarged rhomboidal cross-sectional portion of the respective adjacent conductor pin, whereby the enlarged rhomboidal portions of the pin insulation layers fill a substantial portion of a radial cross-sectional area of the shell between the adjacent pins located between a circle extending through the centers of the three pins and the outer perimeter of the shell.

17. The assembly of claim 1, wherein the insulation layer is of ceramic material.

18. The assembly of claim 1, wherein the insulation layer comprises a first insulation layer having a first end spaced from the first end of the feed-through pin and a second end inside the shell and spaced from the second end of the shell.

19. The assembly of claim 18, further comprising a second insulation layer extending over a portion of the conductive shaft between the second end of the first insulation layer and the second end of the pin, the second insulation layer being thinner than at least the enlarged load-bearing portion of the first insulation layer.

20. The assembly of claim 19, wherein the second insulation layer has a first end spaced from the second end of the first insulation layer and a second end spaced from the second end of the feed-through pin.

21. The assembly of claim 19, wherein the second insulation layer is of higher dielectric strength than the first insulation layer.

22. The assembly of claim 21, wherein the first insulation layer is ceramic material and the second insulation layer is of polyether-ether-ketone (PEEK).

23. The assembly of claim 19, further comprising an auxiliary insulating layer of elastomeric material extending over part of the first insulation layer and at least part of the second insulation layer.

24. The assembly of claim 2, wherein the second end portions of the conductor pins comprise probes configured for releasable mating engagement in respective sockets of a mating subsea connector unit.

25. The assembly of claim 1, further comprising an outer conductive coating covering at least the enlarged load bearing portion of the insulation layer.

26. The assembly of claim 1, wherein the first insulation layer has cylindrical portions extending from opposite ends of the load bearing portion towards the first and second ends of the insulating layer, and tapering portions extending from each cylindrical portion towards the respective end of the insulating layer, and the conductive coating extends over at least the cylindrical portions extending from each end of the load bearing portion.

27. A harsh environment electrical connector assembly, comprising:
an outer shell having a central longitudinal axis and at least one through bore and having a first end configured for exposure to a relatively low pressure environment and a second end configured for exposure to a high pressure subsea environment;
a feed-through conductor pin extending through the at least one bore and having opposite first and second ends, the pin having a central longitudinal axis, a first end portion projecting out through the first end of the shell up to the first end, a second end portion projecting out through the second end of the shell up to the second end, and an intermediate portion extending between the first and second end portions through the bore in the shell;
the conductor pin comprising a conductive shaft of one or more parts extending from the first end to the second end of the pin, and first and second axially spaced insulation layers each extending over respective parts of the length of the shaft;
the first insulation layer having first and second ends and extending along part of the intermediate portion of the pin with the second end spaced inwardly from the second end of the shell;
the second insulation layer having a first end on the intermediate portion spaced from the second end of the first insulation layer and a second end on the second end portion spaced from the second end of the conductive pin;
the first and second insulation layers being of first and second different insulating materials, the first insulating material having a higher heat deflection temperature than the second insulating material; and
the first insulation layer being thicker than the second insulation layer over at least a major part of its length.

28. The assembly of claim 27, wherein the first insulation layer has an enlarged load-bearing portion extending along part of the length of the first insulation layer and spaced from the first and second ends of the first insulation layer.

29. The assembly of claim 28, wherein the enlarged load-bearing portion is of non-circular cross-section.

30. The assembly of claim 29, wherein the enlarged load-bearing portion has two oppositely directed projections each defining a pair of load bearing shoulders facing in opposite directions generally towards the respective first and second ends of the shell, the projections having outer ends defining a first diagonal dimension of the non-circular cross-section of the enlarged load-bearing portion of the pin between the outer ends of the projections, and regions of reduced thickness extending between the projections defining a second diagonal dimension less than the first diagonal dimension.

31. The assembly of claim 30, wherein the enlarged load-bearing portion is of rhomboidal cross-sectional shape with rounded corners and the shell bore has a portion of matching rhomboidal cross-sectional shape which receives the load-bearing portion of the first insulation layer.

32. The assembly of claim 30, wherein the shell has at least two parallel through bores offset from the central longitudinal axis of the shell and first and second identical feed-through conductor pins extending through the respective through bores, each feed-through conductor pin being oriented with the second diagonal dimension extending radially relative to the shell and the oppositely directed projections extending into radial regions of the shell between the conductor pins.

33. The assembly of claim 32, wherein the shell has three parallel through bores offset from the central longitudinal axis of the shell at equal angular spacing around the shell, and first, second and third identical feed-through conductor pins extend through the respective through bores.

34. The assembly of claim 33, wherein the enlarged load-bearing portion of the first insulation layer of each conductor pin is of rhomboidal cross-sectional shape and the respective shell bore has a portion of matching rhomboidal cross-sectional shape which receives the load-bearing portion of the first insulation layer, each enlarged load-bearing portion of a respective pin having substantially flat inner and outer faces extending from an outer end of the respective projection to the center of the respective reduced diameter portions on each side of the projection, and each substantially flat inner face opposes and is parallel to a corresponding substantially flat inner face of the enlarged load-bearing portions of the respective adjacent conductor pins, whereby the enlarged load-bearing portions of the first insulation layers of the pins fill a substantial portion of a radial cross-sectional area of the shell between the adjacent pins located between a circle extending through the centers of the three pins and the outer perimeter of the shell.

35. The assembly of claim 27, wherein the first insulation layer has a first end located outside the first end of the shell.

36. The assembly of claim 27, wherein the second insulation layer is of higher dielectric strength than the first insulation layer.

37. The assembly of claim 36, wherein the first insulation layer is of ceramic material.

38. The assembly of claim 37, wherein the second insulation layer is of polyether-ether-ketone (PEEK).

39. The assembly of claim 27, wherein the second end portion of the conductor pin comprises a probe having a conductive tip and configured for releasable mating engagement in a socket of a mating connector unit.

40. The assembly of claim 27, wherein the first insulation layer has a portion of cylindrical, tapering diameter extending towards the second insulation layer.

41. The assembly of claim 40, further comprising an auxiliary insulating layer of elastomeric material extending over the cylindrical tapering diameter portion of the first insulation layer and at least part of the second insulation layer inside the shell.

42. The assembly of claim 27, further comprising a first metal sealing sleeve extending over the second end of the first insulation layer and secured to adjacent regions of the first insulation layer and the conductive shaft of the pin.

43. The assembly of claim 42, further comprising a second metal sealing sleeve extending over the first end of the first insulation layer and secured between the first insulation layer and an adjacent conductive region of the pin.

44. The assembly of claim 42, wherein the first metal sealing sleeve is welded to the adjacent region of the conductive shaft and brazed onto the adjacent region of the insulation layer.

45. The assembly of claim 43, wherein the second metal sealing sleeve is welded to the adjacent conductive region of the pin and brazed onto an adjacent region of the first insulation layer.

46. The assembly of claim 27, wherein the conductive shaft comprises first and second conductor portions which are telescopically engaged with one another at a location within the first insulation layer.

47. The assembly of claim 27, wherein the conductive shaft comprises a single conductive member extending along at least a major portion of the length of the pin including the intermediate portion and second end portion of the pin.

48. The assembly of claim 27, further comprising an outer conductive coating covering at least the enlarged load bearing portion of the first insulation layer.

49. The assembly of claim 48, wherein the first insulation layer has cylindrical portions extending from opposite ends of the load bearing portion towards the first and second ends of the insulation layer, and tapering portions extending from each cylindrical portion to the respective end of the insulation layer, and the conductive coating extends over at least the cylindrical portions extending from each end of the load bearing portion.

50. The assembly of claim 27, further comprising at least one spring energized metallic seal between the first insulation layer and the shell through bore.

51. The assembly of claim 50, wherein the first insulation layer has an outer metallized coating extending along at least part of its length and the spring energized metallic seal is in sealing engagement with the metallized coating.

52. A conductor pin for a harsh environment connector or penetrator, comprising:
   a conductive shaft of one or more pieces, the shaft having first and second ends;
   an outer layer of non-conductive, insulating material extending over the conductive shaft along at least a major part of the length of the shaft and having first and second ends spaced from the respective first and second ends of the shaft;
   the outer layer being of non uniform diameter along its length and having an intermediate portion of enlarged, non-circular cross-section;
   the intermediate portion having diametrically opposed, outward projections of greater thickness than the remainder of the intermediate portion, the outward projections comprising load bearing shoulders.

53. The conductor pin of claim 52, wherein the intermediate portion has a cross-sectional shape comprising a parallelogram with rounded corners.

54. The conductor pin of claim 53, wherein the parallelogram is of rhomboidal shape.

55. The conductor pin of claim 54, wherein the parallelogram is a rhombus.

56. The conductor pin of claim 52, further comprising a coating of conductive material extending over part of the length of the insulation layer including the enlarged intermediate portion.

57. The conductor pin of claim 52, wherein the outer layer has first and second end portions extending from the intermediate portion to the respective first and second ends of the layer, and each end portion includes a tapered region of reducing diameter towards the respective end of the layer.

58. The conductor pin of claim 52, further comprising a first junction between the first end of the outer layer and an abutting conductive portion of the shaft and a second junction between the second end of the outer layer and an abutting conductive portion of the shaft, and first and second conductive sealing rings extend over the first and second junctions, respectively, and are secured to adjacent conductive and insulating portions on each side of the respective junction.

59. The conductor pin of claim 52, wherein the outer layer comprises a first insulation layer and a second insulation layer of a different insulating material from the first insulation layer extends over the conductive shaft in a region between the second end of the first insulation layer and the second end of the shaft, the second insulation layer being thinner than the first insulation layer and having a first end spaced from the second end of the first insulation layer and a second end spaced from the second end of the shaft.

60. The conductor pin of claim 59, wherein the first insulation layer is of ceramic material and the second insulation layer is of polyether-ether-ketone (PEEK).

* * * * *